United States Patent [19]

Shen

[11] Patent Number: 4,781,928
[45] Date of Patent: Nov. 1, 1988

[54] STABILIZED MOLASSES DISTILLERS CONDENSED SOLUBLES

[75] Inventor: Jerome L. Shen, St. Louis, Mo.

[73] Assignee: Ralston Purina Company, St. Louis, Mo.

[21] Appl. No.: 41,491

[22] Filed: Apr. 23, 1987

[51] Int. Cl.$^4$ ................................................. A23K 1/00
[52] U.S. Cl. ........................................ 426/69; 426/74; 426/654; 426/658; 426/807
[58] Field of Search ............... 426/69, 74, 648, 658, 426/807, 654

[56] References Cited

U.S. PATENT DOCUMENTS

| | | | |
|---|---|---|---|
| 3,895,117 | 7/1975 | Backlund | 426/69 |
| 3,983,255 | 9/1976 | Bass | 426/807 X |
| 4,089,979 | 5/1978 | Jackson | 426/69 |
| 4,160,041 | 7/1979 | Schroeder | 426/69 |
| 4,219,572 | 8/1980 | Jackman | 426/69 |
| 4,382,966 | 5/1983 | Mickus et al. | 426/69 |

OTHER PUBLICATIONS

KELFLOR ® Xanthan Gum-Suspending Aid for Liquid Feed Supplements, Technical Bulletin AF-1.
KELFLO* Xanthan Gum Product for Suspension of Magnesium Oxide in Liquid Feed Supplement-Technical Bulletin AF-5.

*Primary Examiner*—R. B. Penland
*Attorney, Agent, or Firm*—Robert W. Welsh

[57] ABSTRACT

Molasses distillers condensed solubles (MDCS) is stabilized by adding a hydrocolloid so that substantial precipitation of soluble nutrients of the MDCS is avoided, and homogeneous liquid character of the MDCS is preserved at 30° C.

11 Claims, No Drawings

STABILIZED MOLASSES DISTILLERS CONDENSED SOLUBLES

This invention relates to molasses distillers condensed solubles.

The manufacture of monosodium glutamate, alcohol, yeast, citric acid or other products by a fermentation process forms molasses distillers condensed solubles (MDCS) as a by-product. MDCS is composed of many different mineral salts, sugars, proteins and other nutrients. Vinasses is a composition which is a specific form of MDCS. Its composition is similar to molasses which is used as an energy and protein source in animal feeds. Compositions which are similar to MDCS are employed in feed supplements as described in U.S. Pat. No. 4,160,041. Unfortunately, in its recovered form, MDCS cannot be employed in animal feeds. The water content or the concentration of some of the mineral salts are unacceptable for administration to animals.

Removing the water, however, is not sufficient to render MDCS useful as an animal feed supplement. When the water content is reduced, the mineral salts tend to precipitate out of the mixture. The precipitation has a crystalline character and forms a hard packed sediment cake in the recovery vessel. This sediment cake is difficult to remove and cannot be easily re-dispersed through the mixture.

To render the MDCS suitable as a feed supplement, it has become customary to facilitate the precipitation and remove the precipitate as it forms by filtration or centrifugation. These steps are necessary to reduce the potassium level present when beet molasses is used in the fermentation process. However, when cane molasses is employed, the potassium level does not have to be reduced. Yet, because the salts, such as potassium, sodium and ammonium precipitate during the removal of water, the precipitate must still be removed by filtration or centrifugation. These processing steps contribute to the cost of the final product.

Although the sedimentation problem could be solved by maintaining the composition at a high water content, such a composition would be unsuitable for use as a feed supplement. MDCS and other supplements are employed as feed supplements because of their nutritional value. If the supplement has too high of a water content, a given volume of the supplement would have a lower nutritional value compared to the same volume with a lower water content composition. Also, a relatively high salt content can preserve the MDCS against spoilage. Therefore, to provide proper nutrition and stability the water level of the MDCS must be as low as practicable.

Other chemicals may need to be added to the MDCS to facilitate the precipitation of the potassium. This subesequent addition and the filtration and centrifugation steps contribute additional cost elements which detract from the economic value of MDCS as a feed supplement.

Because of these processing difficulties, much of the MDCS is not used at all. It is disposed of, typically by discharge into the environment. This discharge can present an environmental pollution problem.

In view of the economic disadvantages of known methods for using MDCS as a feed supplement and for disposing of it, it would be desirable to have a method whereby MDCS would be rendered readily processable and useful as an animal feed supplement.

SUMMARY OF THE INVENTION

This invention is a molasses distillers condensed solubles composition which is suitable for use as an animal feed supplement comprising liquid molasses distillers condensed solubles which contain an effective amount of nutrients for animals, which are substantially soluble in the liquid, but which can precipitate out of the liquid at about 30° C.; and a stabilizing amount of a water-soluble hydrocolloid, wherein the composition exhibits effective homogeneous liquid character at about 30° C.

In another aspect, this invention is a process for preventing substantially irreversible sedimentation of nutrients for animals from liquid molasses distillers condensed solubles comprising contacting the liquid molasses distillers condensed solubles which contain an effective amount of nutrients which are substantially soluble in the liquid, but which can precipitate out of the liquid at less about 30° C., with a stabilizing amount of a water soluble hydrocolloid.

The invention provides a MDCS composition which is useful as an animal feed supplement. The MDCS compositions of this invention can be used as a substitute for molasses and/or protein in animal feed products.

DETAILED DESCRIPTION OF THE INVENTION

The mineral and protein content of MDCS will vary according to the reagents used in the fermentation process. The MDCS of this invention is in liquid form and has an effective amount of nutrients which is suitable for direct administration to animals such as ruminants. By direct administration and effective amount is meant that except for the neutralization step discussed below, the nutrient content of the MDCS does not need to be supplemented or altered prior to the preparation of the animal feed product. For example, when the potassium content of an animal feed product is too high the product can cause diarrhea in ruminants. When beet molasses is employed as a fermentation reagent, it has a potassium content of about 4.5 weight percent, and the potassium content of MDCS formed from the fermentation of beet molasses must be reduced. However, cane molasses has an initial potassium content of about 2.4 weight percent, and the potassium content of the resultant MDCS is an effective amount and does not need to be supplemented or reduced. The mineral and protein content of MDCS can be determined by conventional analytical methods. Suitable effective amounts of the nutrients in animal feed products are well known, and will vary according to the specific animal to be fed.

Typically, the nutrients in the MDCS comprise proteins, sugars, and minerals such as calcium, phosphorous, magnesium, potassium, sulfur, sodium, iron, magnanese, chloride, and amino acids. As the recovered by product MDCS has a low pH, which is typically below about 3. For application in animal feed products, it is advantageous to raise or even neutralize the pH. This pH adjustment can be achieved by adding sodium hydroxide or ammonia or any other feed grade alkali. Neutralization with ammonia is desirable, because the nitrogen can serve as a protein source in the animal feed.

The nutrients are substantially soluble in the MDCS, which is generally recovered as a solution in water.

However, as the concentration of the MDCS increases, the nutrients, such as potassium, sodium, ammonium, calcium, and phosphorus, tend to precipitate out of the solution. This precipitation generally occurs as the concentration increases over 55 weight percent solids at about 30° C. and below. If the mixture is heated, the nutrients tend to remain in solution. Therefore, heating a 75 weight percent solids MDCS at about 100° C. exhibits a very minor amount of nutrient precipitate. However, when this 75 weight percent solids MDCS is cooled to below about 30° C., a substantial amount of nutrient precipitate is formed.

As an animal feed component, a liquid MDCS having a high solids level, yet a workable viscosity is desired. The solids level contributes to the viscosity of the composition. If the viscosity is too high, the MDCS cannot readily be stored, agitated, or pumped through processing apparatus. An MDCS with a low solids level will have an undesirably high corresponding water level. As mentioned earlier, the high water level will decrease the value of the MDCS as an animal feed supplement. An MDCS with a solids level between about 60 and about 83, preferably between about 75 and about 79, and more preferably about 77 weight percent have the proper balance between nutritional value and viscosity. MDCS with a solids level above 83 weight percent is generally too viscous to be workable.

The preferred MDCS of this invention is the by-product of the fermentation process to prepare monosodium glutamate in which cane molasses is employed as the energy source. Typically, the MDCS is recovered as a 55 weight percent mixture of the MDCS solids in water. A higher weight percent mixture can be prepared by removing the water until the desired level is reached. Any method which removes the water without damaging the solids components can be employed. A preferred method for removing the water is by subjecting the mixture to vaporization conditions of the water. Heating the mixture and vacuum evaporation are suitable. The MDCS forms a thick syrup-like composition as the water is removed. The heating method is preferred, because the nutrients remain substantially soluble in the mixture, and the hydrocolloid can be readily added and dispersed throughout the MDCS.

The hydrocolloids suitable for use in this invention are water-soluble, impart thixotropic behavior to the MDCS, and can thicken the MDCS. A stabilizing amount of the hydrocolloid effectively results in an MDCS composition which does not exhibit substantial precipitation and sedimentation problems at 30° C. and below. The MDCS maintains effective homogeneous liquid character at about 30° C. because of the absence of substantial precipitation and sedimentation. By "effective homogeneous liquid character" is meant that the MDCS composition is a substantially uniform and unchanged liquid for at least a day. Preferably, the MDCS maintains this liquid form for at least four weeks, although the MDCS is acceptable if it separates into layers of different viscosities. For example, the composition can separate into a less viscous layer over a more viscous layer. The separate layers are suitable if they can be restored to uniformity under mild agitation conditions. The most preferred MDCS and hydrocolloid composition maintain substantially uniform and unchanging liquid character for at least two weeks at 25° C. Because the hydrocolloids can thicken the MDCS, it is desirable to employ an amount which is sufficient to stabilize the MDCS, but also which does not render the MDCS too thick to be easily agitated or pumped. Preferably, the MDCS is pumpable at about 15° C., and more preferably at 0° C.

Suitable hydrocolloids are natural and water-soluble gums. Examples of natural gums include carageenan, guar, gum arabic, gum karaya, locust bean gum, xanthan gum, and the like. Example of synthetic gums include cellulose ethers and esters such as hydroxypropyl methylcellulose and carboxymethyl cellulose. Highly preferred hydrocolloids are xanthan gum and guar gum because these gums sufficiently stabilize the MDCS at low levels of administration without rendering the MDCS too thick to be workable.

The amount of hydrocolloid to be employed will vary according to the solids level in the MDCS. For lower solids level MDCS, a larger amount of hydrocolloid will be employed. Typically, for MDCS with about 77 plus or minus 2 weight percent solids level, between about 0.08 to about 0.16, preferably about 0.12 weight percent of hydrocolloid is added to stabilize the MDCS.

The viscosity of the MDCS composition will vary according to the shear rates at which the composition is employed. Under conditions of low shear, for example of about 31 sec.$^{-1}$, the MDCS composition at 25 ° C. can have a viscosity of from about 2000 to about 9500, and preferably from about 4600 to about 8900 cps. Under conditions of moderately low shear, for example of about 245 sec.$^{-1}$, the MDCS composition at 25° C. can have a viscosity of from about 1000 to about 7000, and preferably from about 2200 to about 6300 cps. Under conditions of moderately high shear of about 490 sec.$^{-1}$, the MDCS composition at 25° C. can have a viscosity from about 700 to about 6000, and preferably from about 1700 to about 3500 cps. Under conditions of high shear of about 980 sec.$^{-'}$, the MDCS composition at 25° C. can have a viscosity of from about 500 to about 5000, and preferably from about 1100 to about 3000 cps.

The hydrocolloid is contacted with the MDCS under conditions sufficient to disperse the hydrocolloid throughout the MDCS. Preferably, the hydrocolloid is added in the form of a dry powder, because if it is added as a solution, the water or other solvent may have to be removed in a subsequent process step. This subsequent process step will contribute to cost and is unnecessary if dry addition is suitable. Most preferably, the hydrocolloid is added to the MDCS at elevated temperatures at which the nutrients are substantially soluble and unprecipitated from the MDCS. Addition of the hydrocolloid before the formation of a substantial amount of sediment can result in a cooled MDCS composition containing a reduced amount of precipitate.

Such a preferred addition temperature is the vaporization temperature of water. Although the hydrocolloid can be added at any stage during the evaporation, the preferred point of addition is at the end of evaporation but while the MDCS is still at the evaporation temperature. Addition at this point avoids thickening the MDCS and lowering the vapor pressure of the MDCS during evaporation.

The stabilized MDCS composition of this invention can be directly substituted for or can supplement molasses or protein in the manufacture of animal feeds. Examples of animal feeds include liquid feeds supplements, and solid feed supplements. The MDCS composition of this invention can also be employed as a pelleting aid.

The following examples illustrate the invention and do not limit its scope.

EXAMPLE 1

Several samples of liquid MDCS formed from the production of monosodium glutamate using cane molasses and having 55% solids is concentrated by vacuum evaporation to between approximately 72% and 83% solids. Varying amounts of guar gum are dusted onto, and stirred into the hot MDCS. The mixtures are stirred rapidly for about 10 to 15 minutes to insure proper hydration of the gum. The mixtures are then cooled to about 25° C. and observed for stability. The results are disclosed in Table 1.

EXAMPLE 2

Example 1 is repeated, except that xanthan gum is substituted for guar gum. Stability observations are made and recorded in Table 1.

TABLE 1

| | Amount of Gum | Weight Percent Solids in MDCS | Stability 27° C. | Stability 51° C. |
|---|---|---|---|---|
| Gum Guar Sample # | | | | |
| 1 | 0.10% | 83% | A | A |
| 2 | 0.10% | 82% | A | A |
| 3 | 0.12% | 78% | A | A |
| 4 | 0.10% | 78% | B | C |
| 5 | 0.12% | 76% | B | C |
| 6 | 0.10% | 76% | C | C |
| 7 | 0.12% | 74% | C | C |
| 8 | 0.12% | 72% | C | C |
| 9 | 0.15% | 72% | B | C |
| Xanthan Sample # | | | | |
| 10 | 0.10% | 78% | A | No Measurement |
| 11 | 0.08% | 78% | A | No Measurement |
| 12 | 0.08% | 76% | B | No Measurement |

1 Weight percent of gum in MDCS and mixture
2 Stability is measured by observing the mixture over time at the indicated temperature. "A" indicates the sample remained substantially uniform and unchanged with liquid charcter after one week of storage. "B" indicates that, after 1 week, less than 10% of a less viscous liquid formed over a more viscous; gel-like soft body. The two layers are miscible under mild agitation conditions. "C" indicates that after 1 week, there is more than 10% separation. The two layers are also re-dispersable.

The MDCS compositions of this example do not exhibit a detrimental amount of nutrient precipitation. The MDCS and gum compositions of the examples are also storable and pumpable.

What is claimed is:

1. A process for preventing substantially irreversible sedimentation of animal nutrients from liquid molasses distillers condensed solubles (MDCS) consisting essentially of mixing the MDCS "with a stabilizing amount of a water-soluble hydrocolloid, said MDCS containing an amount of nutrients sufficient for direct administration which nitrients are substantially soluble in the liquid, and which liquid has a solids level of between about 60 weight percent and about 83 weight percent, but which nutrient solids can precipitate out of the liquid at about 30° C. with a stabilizing amount of a water-soluble hydrocolloid.

2. The process of claim 1, wherein the MDCS is a by-product of the fermentation process used to prepare monosodium glutamate in which cane molasses is employed as the energy source, and the nutrients comprise potassium, sodium, ammonium, calcium and phosphorus.

3. The process of claim 2, wherein the hydrocolloid is guar gum.

4. The process of claim 3, wherein the guar gum is employed at between about 0.10 and about 0.14 weight percent.

5. The process of claim 4, wherein the mixture maintains substantially uniform and unchanging liquid character for one week at 25° C.

6. The process of claim 3, wherein mixture maintains substantially uniform and unchanging liquid character for one week at 25° C.

7. The process of claim 2, wherein the hydrocolloid is xanthan gum.

8. The process of claim 7, wherein the xanthan gum is employed at between about 0.08 and about 0.16 weight percent.

9. The process of claim 8, wherein the mixture maintains substantially uniform and unchanging liquid character for one week at 25° C.

10. The process of claim 9, wherein the mixture exhibits a viscosity at 25° C. and at a shear rate of 31 sec.$^{-1}$, of from about 2000 to about 9500 cps.

11. The process of claim 10, wherein the mixture exhibits a viscosity at 25° C. and at a shear rate of 31 sec.$^{-1}$, of from about 4600 to about 8900 cps.

* * * * *